(12) United States Patent  
Andreasson et al.

(10) Patent No.: US 9,055,116 B2
(45) Date of Patent: Jun. 9, 2015

(54) PRESENCE SYSTEM, COMMUNICATION TERMINAL, SERVER AND COMPUTER PROGRAM PRODUCT THEREFOR

(75) Inventors: Mans Folke Markus Andreasson, Lund (SE); Henrik Bengtsson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1186 days.

(21) Appl. No.: 11/742,126

(22) Filed: Apr. 30, 2007

(65) Prior Publication Data
US 2008/0208990 A1 Aug. 28, 2008

Related U.S. Application Data

(60) Provisional application No. 60/891,958, filed on Feb. 28, 2007.

(51) Int. Cl.
*H04L 29/08* (2006.01)
*H04L 29/06* (2006.01)
(52) U.S. Cl.
CPC .............. *H04L 67/24* (2013.01); *H04L 65/1006* (2013.01)
(58) Field of Classification Search
CPC ...... H04L 67/24; H04L 65/1006; G06F 15/16
USPC .................. 709/204–207, 223–224
See application file for complete search history.

(56) References Cited

U.S. PATENT DOCUMENTS

| 6,865,385 B1* | 3/2005 | Kohda et al. ................... 709/230 |
| 6,996,733 B2* | 2/2006 | Hershenson et al. ......... 713/340 |
| 2004/0122977 A1 | 6/2004 | Moron et al. |
| 2004/0128310 A1* | 7/2004 | Zmudzinski et al. ......... 707/102 |
| 2005/0071433 A1* | 3/2005 | Shah ............................. 709/207 |

FOREIGN PATENT DOCUMENTS

| EP | 1 292 081 A | 3/2003 |
| EP | 1 727 329 A | 11/2006 |
| JP | 2003-250000 | 9/2003 |
| JP | 2006-511863 | 4/2006 |

(Continued)

OTHER PUBLICATIONS

International Search Report for corresponding Application No. PCT/EP2007/058937, mailed Nov. 8, 2007.

(Continued)

*Primary Examiner* — Ebrahim Golabbakhsh
(74) *Attorney, Agent, or Firm* — Renner, Otto, Boisselle & Sklar, LLP

(57) ABSTRACT

A presence system in which communication terminals and a presence server may cooperate to provide status notifications. A communication terminal may provide the server a store message to suspend transmission of status notifications to that communication terminal. The presence server may be arranged so that in response to a store message requesting storage of status notifications the transmission of status notifications from the server to that communication terminal is suspended. Several approaches to release the suspension are provided. The presence system, communication terminal and/or the communication presence server may include hardware and/or computer code or software to provide the respective functions and operations.

15 Claims, 1 Drawing Sheet

(56) References Cited

FOREIGN PATENT DOCUMENTS

| | | |
|---|---|---|
| JP | 2006-352662 | 12/2006 |
| WO | 2007/046364 | 4/2007 |

OTHER PUBLICATIONS

Written Opinion of the International Searching Authority, mailed Nov. 8, 2007.

Roach A: "SIP-Specific Event Notification" Internet Draft, Jul. 2001, pp. 1-32 XP002189884.

Rosenberg et al; "SIP Extensions for Presence" IEEE Internet Draft, Mar. 2, 2001, pp. 1-39 XP002189885 (whole document).

Office Action dated Apr. 19, 2011 in corresponding Mexican Application No. MX/a/2009/008818.

English translation of Office Action dated Mar. 5, 2012 in corresponding Japanese Application No. 2009-551922.

\* cited by examiner

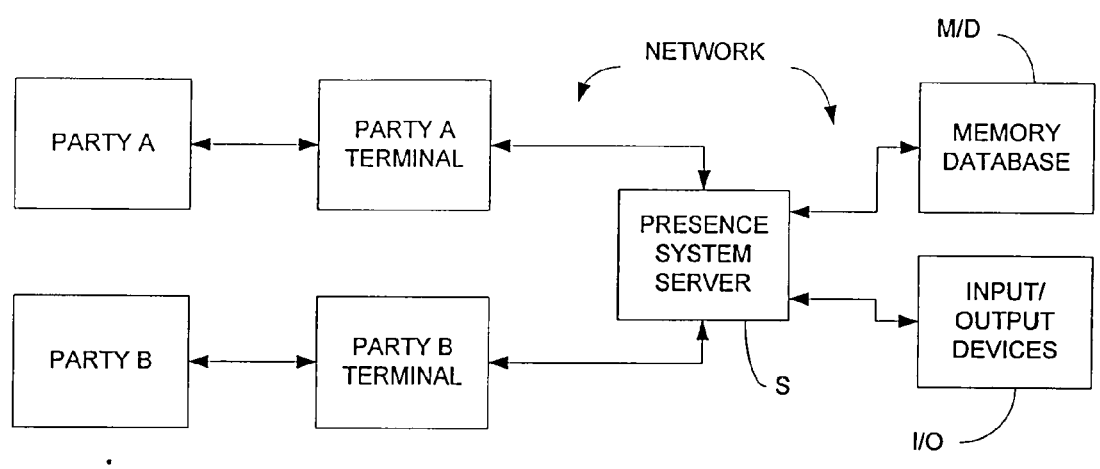

PRESENCE SYSTEM, COMMUNICATION TERMINAL, SERVER AND COMPUTER PROGRAM PRODUCT THEREFOR

CROSS-REFERENCE TO RELATED APPLICATION

This application claims the benefit of U.S. Provisional Patent Application Ser. No. 60/891,958, filed Feb. 28, 2007, which is incorporated herein by reference in its entirety.

FIELD OF THE INVENTION

The present invention relates to a presence system with controllable status notifications. The present invention also relates to a communication terminal, a server and a computer program product therefor.

BACKGROUND OF THE INVENTION

In an attempt to bring the telecoms and Internet worlds—fixed and mobile, voice and data, personal and enterprise together, the standardized IP Multimedia Subsystem (IMS) architecture has been created. Among other things, IMS enables presence systems. A presence system is a system letting users or parties manage their accessibility—or their 'presence'—, so that they can control how, where, when and by whom they can be reached. A party subscribing to the presence system will receive status notifications from another when the other party's status changes, e.g. from online to offline.

Current technology for spreading presence status is based on the principle that when the presence status of one party is changed, it will be sent to the subscribers of presence status from that party. However, this induces some problems.

First of all, when a presence status notification is about to be received in a terminal the radio part of the terminal is brought up from sleep mode and stays up for a significant time. This drains the battery of the terminal. When the user is interested in the presence status of his contacts, i.e. when he is looking at the display, i.e. is already in an active mode, this may not be a problem, but when the terminal is in overall sleep mode (e.g. when in a pocket or bag of the user) it is a real problem. One should realize that the amount of data sent in a single presence notification is very small (e.g. hundreds of bytes) while the amount of data possible to transfer during the time the radio is in active mode is considerably larger (e.g. several thousands of bytes).

Another problem with unnecessary presence notifications is that the bandwidth of the network connection of the terminal is reduced.

In the present invention, unwanted wake ups and unnecessary current consumption may be avoided by letting a party control when to receive status notifications by requesting at least a temporary storage of status messages in the presence system server. The request may be made conditional on time, the second party and other information. The request may be sent automatically and/or controlled by the user.

An aspect of the invention relates to a presence system including communication terminals belonging to a number of parties; a presence server connectable by the communication terminals over a network, the communication terminals and the server including hardware and software to implement the presence system for managing accessibility of parties, wherein: at least one communication terminal is arranged to send a STORE message to the server requesting storage of status notifications, so that transmission of status notifications from the server to that communication terminal is suspended.

Another aspect relates to a presence system, wherein said STORE message contains a time dependent condition.

Another aspect relates to a presence system, wherein said STORE message contains a condition dependent on a monitored party's address.

Another aspect relates to a presence system, wherein said STORE message contains a condition dependent on an activity in monitored party's communication terminal.

Another aspect relates to a presence system, wherein the at least one communication terminal is arranged to send a RELEASE message to the server requesting release of status notifications from the server to that communication terminal.

Another aspect relates to a presence system, wherein said RELEASE message contains a time dependent condition.

Another aspect relates to a presence system, wherein said RELEASE message contains a condition dependent on a monitored party's address.

Another aspect relates to a presence system, wherein said RELEASE message contains a condition dependent on an activity in monitored party's communication terminal.

Another aspect relates to a presence system, wherein said at least one communication terminal is arranged to send a RELEASE message automatically, when the terminal changes state from sleeping to active mode.

Another aspect relates to a presence system, wherein said at least one communication terminal is arranged to send a RELEASE message automatically, when the communication terminal enters a contact list or other application containing presence status display.

Another aspect relates to a presence system as described herein.

Another aspect relates to a communication terminal belonging to a party and connectable to a presence server over a network, the communication terminal including hardware and software to implement a presence system for managing accessibility of parties, wherein: the communication terminal is arranged to send a STORE message to the server requesting storage of status notifications, so that transmission of status notifications from the server to that communication terminal is suspended.

Another aspect relates to a communication terminal as described herein.

Another aspect relates to a presence server connectable to communication terminals belonging to a number of parties over a network, the server including hardware and software to implement a presence system for managing accessibility of parties, wherein: the server is arranged to receive a STORE message requesting storage of status notifications, so that transmission of status notifications from the server to that communication terminal is suspended.

Another aspect relates to a presence server as described herein.

Another aspect relates to a computer program product for providing a presence system in a system including communication terminals belonging to a number of parties; a presence server connectable by the communication terminals over a network, said computer program product including: computer program code means for providing a presence system as described herein.

Another aspect relates to a computer program product for providing a presence system in a communication terminal, said computer program product including: computer program code means for providing a communication terminal as described herein.

Another aspect relates to a computer program product for providing a presence system in a server, said computer program product including: computer program code means for providing a server as described herein.

These and further aspects and features of the present invention will be apparent with reference to the following description and attached drawing. In the description and drawing, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprise/comprising" when used in this specification is taken to specify the presence of stated features, integers, steps or components but does not preclude the presence or addition of one or more other features, integers, steps, components or groups thereof."

The term "electronic equipment" includes portable radio communication equipment. The term "portable radio communication equipment," may be referred to below as a "mobile radio terminal," "mobile phone," "mobile device," or "mobile terminal" and the like, and includes all equipment such as mobile telephones, pagers, communicators, i.e., electronic organizers, personal digital assistants (PDAs), smartphones, portable communication apparatus or the like. The term "electronic equipment" also may include portable digital music devices, e.g., iPod devices, mp3 players, etc. A portable radio communication device may also be a portable digital music device.

BRIEF DESCRIPTION OF THE DRAWING

In the drawing the sole FIGURE, FIG. 1, is a schematic illustration of a system using the invention.

DESCRIPTION OF THE INVENTION

The present invention proposes a set of solutions that addresses the problems described above.

The present invention will be described with some non-limiting examples. First we present how to increase the number of presence notifications per session when the radio is in active mode. This will reduce the amount of battery energy required per presence notification. Then we present when the presence notifications should be received in order to increase the usability.

The present invention may be implemented using conventional hardware and software technology enhanced by the functions according to the invention. An embodiment of a presence system according to the invention comprises a number of parties, A, B, etc, each with a communication terminal connected over a network, typically a telecommunications network. The terminals may establish contact with a presence system server S managing a database (D), e.g., in a memory (M) or stored or provided from elsewhere, with status information and receiving and transmitting status notifications/messages to the respective parties. Input and output devices (I/O) may be provided the server S, e.g., to provide manual or other inputs thereto, as from a keyboard, network connection, mouse, memory, etc., and/or to provide output to show status of the server, operation of the server, and/or to provide other output, operational, control and/or like functions.

Today presence subscription and notification, e.g. using IMS, is done in the following manner:
1. When Party A wants to monitor the accessibility of a Party B, Party A sends a subscription request to party B via a server S.
2. Party B sends a subscription acknowledgement to party A via the server S.
3. Party B publishes presence status to server S.
4. Server S sends a presence notification to party A containing presence status of party B.
5. In case of status changes, Party B changes the presence status (e.g. from online to offline).
6. Party B again publishes presence status to server S.
7. Server S again sends a presence or status notification to party A containing presence status of party B.

Thus, each time Party B changes the presence status, a status notification is sent to Party A resulting in the problems outlined above.

The present invention proposes the following manner instead:
1. Party A sends a conditional subscription request to party B via a server S.
2. Party B sends a subscription acknowledgement to party A via the server S.
3. The server S registers the party A as receiver of notifications from party B.
4. Party B publishes presence status to server S.
5. In dependence of the conditional subscription request, server S stores the presence status but doesn't pass it along to party A.
6. Party B changes the presence status (e.g. from online to offline).
7. Party B again publishes presence status to server S.
8. Server S updates and stores the presence status and doesn't pass it along to party A. The old status is discarded.
9. Party A sends a notification release command to the server S.
10. Server S sends a notification containing the stored presence status from party B to party A.

Note that the activity of party B is identical in both procedures. This means that party B doesn't have to support party A in reducing notifications.

In IMS, presence notification is defined by the OMA PAG SIMPLE standard which uses the Session Initiation Protocol, SIP, messages SUBSCRIBE, PUBLISH and NOTIFY according to the first procedure above. ("OMA" is an acronym for "Open Mobile Alliance"; "PAG" is an acronym for "Presence and Availability working Group"; and "SIMPLE" is an acronym for "SIP for Instant Messaging and Presence Leveraging Extensions.")

In the present invention the protocol is extended with additional markers enabling the desired functions of the invention. SIP messages are able to accommodate general markers. In one embodiment of the present invention, the function according to the present invention as set forth above is implemented according to the following scheme using SIP messages:
1. Party A sends a SUBSCRIBE to party B via server S. The presence application is defined in the header according to OMA PAG. According to an embodiment of the invention, an additional marker, "STORE" in the header (or body) tells the server S that the notifications from party B should be stored until further notice. The server S removes the "STORE" marker before sending the message on to party B.

2. Party B sends a subscription acknowledgement to party A via the server S (using the SIP message 200 OK).
3. The server S registers the party A as receiver of notifications from party B.
4. Party B publishes presence status to server S (using PUBLISH).
5. Server S stores the presence status.
6. Party B changes the presence status (e.g. from online to offline).
7. Party B again publishes presence status to server S (using PUBLISH).
8. Server S stores the presence status. The old status is discarded.
9. Party A sends a new SUBSCRIBE to party B via server S. The difference between this message and the message sent in 1 is that an additional RELEASE marker in the header. "RELEASE" tells the server S that the notifications from party B should be released. The message is not sent on from the server S to the party B.
10. Server S sends a notification containing the stored presence status from party B to party A (using NOTIFY).

The STORE marker may contain further conditions allowing the subscribing Party A to differentiate between different monitored parties, and depending on time and other user defined conditions.

A general STORE marker with no further conditions will result in that all status information is stored in the server and no status notifications are sent to the subscribing party until release is requested.

A STORE marker further containing the address of party B or a group of addresses will result in that status information relating to Party B or the group is stored in the server until release is requested. Status notifications from other parties are permitted to be sent to the subscribing Party A.

As the SIP message SUBSCRIBE itself will contain the address of party B, it is generally not necessary to present it in the STORE marker as well, but could be assumed as a default value of the marker, if not defined otherwise by the user.

A STORE marker may further contain time conditions. For example, a STORE marker further containing the condition "30 minutes" will result in that all status information is stored in the server and no status notifications is sent to the subscribing party until 30 minutes have passed. Then, the setting existing before the Party A sent the SUBSCRIBE message with the condition will be resumed. The time condition may also be defined as a specific time, e.g. 11:00 or time interval, e.g. 11:00-12:00. Then status information is stored until the time is after 11:00, and between 11:00-12:00, respectively. For example, Party A may set the marker so that all status notifications are stored during night time.

The RELEASE marker may contain similar conditions.

A general RELEASE marker with no further conditions will result in that all status information is released in the server and all status notifications are sent to the subscribing party.

A RELEASE marker further containing the address of party B or a group of addresses will result in that status information relating to Party B or the group is released in the server. Status notifications from other parties are not to be sent to the subscribing Party A but stored.

A RELEASE marker may further contain time conditions. For example, a RELEASE marker further containing the condition "30 minutes" will result in that all status information is allowed to be sent from the server to the subscribing party until 30 minutes have passed. Then, the setting existing before the Party A sent the SUBSCRIBE message with the RELEASE condition will be resumed. The time condition may also be defined as a specific time, e.g. 11:00 or time interval, e.g. 11:00-12:00. Then status information is released until the time is after 11:00, and between 11:00-12:00, respectively. For example, Party A may set the marker so that all status notifications are released during office hours.

A STORE and/or RELEASE marker may further contain other user defined conditions, for instance relating to activities in the terminal of the monitored party B. For example, Party A may send a SUBSCRIBE message with a STORE/RELEASE marker containing the condition "listening to artist ZZ". When a terminal of the monitored party B enters his music player and plays a song performed by artist ZZ, the artist information is for example retrieved from the song's meta-data and Party B publishes presence status to server S containing the artist information. The server S matches the artist information with the condition and sends a notification containing the presence status from party B to party A, thus possibly overriding any other conditions.

In one embodiment, the STORE and/or RELEASE marker is set automatically in dependence of a calendar function in the terminal. Thus, if a meeting a scheduled in the calendar between 11:00-12:00, at 11:00 the terminal sends a SUBSCRIBE message with a STORE marker blocking status notifications for one hour. If the calendar function contains information about the participants in the meeting, the STORE marker may contain conditions allowing status notifications from the participant parties.

The above conditions may be combined with each other.

Thus, aggregated presence status from several subscribed parties can be handled. All SUBSCRIBE messages marked with "STORE" should result in stored data from PUBLISH messages. When the party A then sends a SUBSCRIBE message, containing the address of party B, marked with "RELEASE" the stored presence status of party B should be sent as described above. However, if the message is marked with "RELEASE_ALL", all stored presence status from all subscribed parties should be sent either as several NOTIFY messages or as one or several aggregated messages.

The technology described above allows the party A to decide when the presence notifications should be received.

In a further embodiment, the present invention proposes the following logical situations for automatically releasing presence status notifications:

1. When the terminal changes state from sleeping to active (e.g. when the display backlight is lit). This happens when the user starts using the terminal actively and is thus interested in presence information. It could also happen when the terminal is receiving a telephone call or message (e.g. SMS), thus going from sleeping to active mode.
2. When the user enters the contact list or other application containing presence status display.
3. The combination of 1 AND 2.
4. When the user moves focus to a certain contact from which presence information is subscribed.

In these situations, the terminal automatically sends a new SUBSCRIBE to the server S with a RELEASE marker in the header. The situation may determine if one, (Party B) or a group or all notifications should be released.

The present invention involves several advantages over the prior art. The invention lets the receiving party determine when presence notifications should be sent. This reduces the energy consumption in the terminal as well as the bandwidth consumption in the network. Presence systems will be more useful with this invention as the battery consumption will be reduced.

As will be appreciated by one of ordinary skill in the art, computer program elements and/or circuitry elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

The invention may be implemented by means of suitable combinations of hardware and software. The invention is not limited to any particular format of presence system and messages, such as within the IMS standard. Further formats may be developed in the future providing the same technical functions. The scope of the invention is only limited by the claims below.

The invention claimed is:

1. A presence system comprising communication terminals belonging to a number of parties;
   a presence server connectable by the communication terminals over a network, the communication terminals and the server comprising hardware and software to implement the presence system for managing accessibility of parties, wherein:
   at least one mobile communication terminal is arranged to send a STORE message to the server requesting storage of status notifications in the server, wherein the STORE message is an indication that the mobile communication terminal is in energy saving sleep mode, wherein said status notifications indicate a change in presence status of said accessible parties, so that transmission of status notifications from the server to that mobile communication terminal is suspended; wherein said STORE message, requesting storage of status notifications, is not sent to said accessible parties.

2. A presence system as claimed in claim 1, wherein said STORE message contains a time dependent condition.

3. A presence system as claimed in claim 1, wherein said STORE message contains a condition dependent on a monitored party's address.

4. A presence system as claimed in claim 1, wherein said STORE message contains a condition dependent on an activity in monitored party's communication terminal.

5. A presence system as claimed in claim 1, wherein the at least one mobile communication terminal is arranged to send a RELEASE message to the server requesting release of status notifications from the server to that mobile communication terminal.

6. A presence system as claimed in claim 5, wherein said RELEASE message contains a time dependent condition.

7. A presence system as claimed in claim 5, wherein said RELEASE message contains a condition dependent on a monitored party's address.

8. A presence system as claimed in claim 5, wherein said RELEASE message contains a condition dependent on an activity in monitored party's communication terminal.

9. A presence system as claimed in claim 5, wherein said at least one mobile communication terminal is arranged to send a RELEASE message automatically, when the terminal changes state from sleeping to active mode.

10. A presence system as claimed in claim 5, wherein said at least one mobile communication terminal is arranged to send a RELEASE message automatically, when the communication terminal enters a contact list or other application containing presence status display.

11. A non-transitory computer usable medium for providing a presence system in a system comprising communication terminals belonging to a number of parties;
    a presence server connectable by the communication terminals over a network, said computer program product comprising:
    computer program code means for providing a presence system as claimed in claim 1.

12. A mobile communication terminal belonging to a party and connectable to a presence server over a network, the mobile communication terminal comprising hardware and software to implement a presence system for managing accessibility of parties, wherein:
    the mobile communication terminal is arranged to send a STORE message to the server requesting storage of status notifications in the server, wherein the STORE message is an indication that the mobile communication terminal is in energy saving sleep mode, wherein said status notifications indicate a change in presence status of said accessible parties, so that transmission of status notifications from the server to that mobile communication terminal is suspended: wherein said STORE message, requesting storage of status notifications, is not sent to said accessible parties.

13. A non-transitory computer usable medium for providing a presence system in a communication terminal, said computer program product comprising:
    computer program code means for providing a communication terminal as claimed in claim 12.

14. A presence server connectable to communication terminals belonging to a number of parties over a network, the server comprising hardware and software to implement a presence system for managing accessibility of parties, wherein:
    the server is arranged to receive a STORE message from one mobile communication terminal, wherein the STORE message is an indication that the mobile communication terminal is in energy saving sleep mode, requesting storage of status notifications in the server, wherein said status notifications indicate a change in presence status of said accessible parties, so that transmission of status notifications from the server to that mobile communication terminal is suspended; wherein said STORE message, requesting storage of status notifications, is not sent to said accessible parties.

15. A non-transitory computer usable medium for providing a presence system in a server, said computer program product comprising:
   computer program code means for providing a server as claimed in claim 14.

\* \* \* \* \*